US008520412B2

(12) United States Patent
Kimura

(10) Patent No.: US 8,520,412 B2
(45) Date of Patent: Aug. 27, 2013

(54) SYNCHRONOUS OPERATING SYSTEM FOR DISCHARGE TUBE LIGHTING APPARATUSES, DISCHARGE TUBE LIGHTING APPARATUS, AND SEMICONDUCTOR INTEGRATED CIRCUIT

(75) Inventor: Kengo Kimura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 210 days.

(21) Appl. No.: 13/211,727

(22) Filed: Aug. 17, 2011

(65) Prior Publication Data

US 2011/0299310 A1 Dec. 8, 2011

Related U.S. Application Data

(63) Continuation of application No. 12/302,814, filed as application No. PCT/JP2007/067609 on Sep. 10, 2007, now Pat. No. 8,159,145.

(30) Foreign Application Priority Data

Oct. 5, 2006 (JP) ................................ 2006-274186

(51) Int. Cl.
*H02M 7/02* (2006.01)

(52) U.S. Cl.
USPC ..................... 363/21.02; 363/21.03; 363/131; 315/291; 315/297; 315/294; 315/209 R

(58) Field of Classification Search
USPC .......... 315/291, 294, 297, 209 R; 363/21.02, 363/21.03, 131, 120
See application file for complete search history.

(56) References Cited

U.S. PATENT DOCUMENTS

| | | | |
|---|---|---|---|
| 5,615,093 | A | 3/1997 | Nalbant |
| 6,002,214 | A | 12/1999 | Ribarich |
| 6,198,198 | B1 | 3/2001 | Fujimura et al. |
| 2003/0071586 | A1 | 4/2003 | Lin et al. |
| 2005/0128775 | A1 | 6/2005 | Fukumoto |
| 2005/0156536 | A1 | 7/2005 | Ball |
| 2009/0243505 | A1 | 10/2009 | Kimura |
| 2011/0012527 | A1 | 1/2011 | Kimura et al. |

FOREIGN PATENT DOCUMENTS

| | | |
|---|---|---|
| JP | 10 50491 | 2/1998 |
| JP | 10 285942 | 10/1998 |
| JP | 2002 319499 | 10/2002 |
| JP | 2005 5059 | 1/2005 |

*Primary Examiner* — Douglas W Owens
*Assistant Examiner* — Jonathan Cooper
(74) *Attorney, Agent, or Firm* — Oblon, Spivak, McClelland, Maier & Neustadt, L.L.P.

(57) ABSTRACT

A synchronous operating system for operating a plurality of discharge tube lighting apparatuses at the same frequency and same phase includes (1) an oscillator of a triangular wave signal whose inclination for charging a capacitor C2 and inclination for discharging the same are the same, (2) a signal generation part to generate, in a period shorter than a half period of the triangular wave signal, a first drive signal having a pulse width corresponding to a load current, and (3) a signal generation part of a second drive signal having a pulse width substantially equal to that of the first drive signal and a phase difference of about 180 degrees with respect to the same.

9 Claims, 15 Drawing Sheets

SYNCHRONOUS OPERATING SYSTEM FOR DISCHARGE TUBE LIGHTING APPARATUSES, DISCHARGE TUBE LIGHTING APPARATUS, AND SEMICONDUCTOR INTEGRATED CIRCUIT

CROSS-REFERENCE TO RELATED APPLICATIONS

This application is a continuation of U.S. application Ser. No. 12/302,814 filed Nov. 28, 2008, the entire content of which is incorporated herein by reference, and which is the National Stage of PCT/JP07/67609 filed Sep. 10, 2007 and claims the benefit of priority under 35 U.S.C. 119 to Japanese Application No. 2006-274186 filed Oct. 5, 2006. The entire contents of Japanese Application No. 2006-274186 are incorporated herein by reference.

TECHNICAL FIELD

The present invention relates to a synchronous operating system for synchronously operating a plurality of discharge tube lighting apparatuses that are connected to one another to light discharge tubes, in particular, cold cathode tubes of a liquid crystal display unit or the like. It also relates to a discharge tube lighting apparatus and a semiconductor integrated circuit.

BACKGROUND TECHNOLOGY

A discharge tube, in particular, a cold cathode fluorescent lamp (CCFL) causes, when a passing current becomes imbalanced to bias a mercury distribution in the discharge tube, a brightness gradient, a life reduction of the discharge tube, a change in emission color, and the like. Accordingly, an absolute requirement for the discharge tube lighting apparatus is to supply a positive-negative symmetrical current to the discharge tube.

FIG. 1 is a circuit diagram illustrating a configuration of a related discharge tube lighting apparatus. FIG. 2 is a timing chart illustrating signals at various parts of the related discharge tube lighting apparatus. In the discharge tube lighting apparatus illustrated in FIG. 1, connected between a DC power source Vin and the ground is a first series circuit having a high-side p-type MOSFET Qp1 (referred to as p-type FET Qp1) and a low-side n-type MOSFET Qn1 (referred to as n-type FET Qn1). Between a connection point of the p-type FET Qp1 and n-type FET Qn1 and the ground GND, there is connected a series circuit consisting of a capacitor C3 and a primary winding P of a transformer T. Both ends of a secondary winding S of the transformer T are connected to a series circuit having a reactor Lr and a capacitor C4.

A source of the p-type FET Qp1 receives the DC power source Vin and a gate of the p-type FET Qp1 is connected to a terminal DRV1 of a controller (IC) 1. A gate of the n-type FET Qn1 is connected to a terminal DRV2 of the IC 1.

The controller IC1 has a start circuit 10, a constant current determination circuit 11, an oscillator 12, a frequency divider 13, an error amplifier 15, a PWM comparator 16, a NAND gate 17*a*, an AND gate 17*b*, and drivers 18*a* and 18*b*. The constant current determination circuit 11 is connected through a terminal RF to an end of a constant current determination resistor R1. The oscillator 12 is connected through a terminal CF to an end of a capacitor C1.

The start circuit 10 receives power from the DC power source Vin to generate a predetermined voltage REG and supply the same to various internal parts. The constant current determination circuit 11 provides the oscillator 12 with a constant current that is optionally set by the constant current determination resistor R1. According to the constant current from the constant current determination circuit 11, the oscillator 12 charges and discharges the capacitor C1, to generate a sawtooth oscillating waveform as illustrated in FIG. 2 (illustrated in FIG. 2 is charge/discharge voltage of the capacitor C1 at the terminal CF), and according to the sawtooth oscillating waveform, generates a clock CK. The clock CK has, as illustrated in FIG. 2, a pulse voltage waveform that is synchronized with the sawtooth oscillating waveform at the terminal CF so that it becomes high level during a rise period of the sawtooth oscillating waveform and low level during a fall period of the same. The clock CK is outputted to the frequency divider 13.

An end of the secondary winding S of the transformer T is connected through the reactor Lr to an electrode of a discharge tube 3, and the other electrode of the discharge tube 3 is connected to a tube current detection circuit 5. The tube current detection circuit 5 has diodes D1 and D2 and resistors R3 and R4, to detect a current passed to the discharge tube 3 and output a voltage proportional to the detected current to an inverting terminal (as depicted by "−") of the error amplifier 15 through a feedback terminal FB of the controller 1.

The error amplifier 15 amplifiers an error voltage FBOUT between the voltage from the tube current detection circuit 5 inputted to the inverting terminal and a reference voltage E1 inputted to a non-inverting terminal (as depicted by "+") and sends the error voltage FBOUT to a non-inverting terminal (as depicted by "+") of the PWM comparator 16. The PWM comparator 16 generates a pulse signal that is high level if the error voltage FBOUT from the error amplifier 15 input to the non-inverting terminal is equal to or higher than the sawtooth waveform voltage from the terminal CF input to an inverting terminal (as depicted by "−") and low level if the error voltage FBOUT is lower than the sawtooth waveform voltage. The pulse signal is output to the NAND gate 17*a* and AND gate 17*b*.

The frequency divider 13 divides the frequency of the pulse signal from the oscillator 12 and provides the NAND gate 17*a* with a frequency-divided pulse signal Q and the AND gate 17*b* with a pulse signal (having a predetermined dead time with respect to the frequency-divided pulse signal Q) formed by inverting the frequency-divided pulse signal Q. The NAND gate 17*a* operates the NAND function of the frequency-divided pulse signal from the frequency divider 13 and the signal from the PWM comparator 16 and outputs a drive signal through the driver 18*a* and terminal DRV1 to the p-type FET Qp1. The AND gate 17*b* operates the AND function of the inverted frequency-divided pulse signal from the frequency divider 13 and the signal from the PWM comparator 16 and outputs a drive signal through the driver 18*b* and terminal DRV2 to the n-type FET Qn1.

From time t1 to t2, for example, the output from the PWM comparator 16 is high level, the output from the frequency divider 13 is high level, and the output of the NAND gate 17*a* is low level. As a result, the terminal DRV1 provides a low-level output to turn on the p-type FET Qp1. From time t4 to t5, the output from the PWM comparator 16 is high level, the inverted output from the frequency divider 13 is high level, and the output from the AND gate 17*b* is high level. As results, the terminal DRV2 provides a high-level output to turn on the n-type FET Qn1.

Namely, the drive signals are formed by combining the outputs from the frequency divider 13 and the output from the PWM comparator 16 and are alternately sent to the terminals DRV1 and DRV2 in synchronization with the clock CK with a fall period of the sawtooth oscillating waveform serving as a dead time. Through the above-mentioned operation, the controller 1 alternately turns on/off the p-type FET Qp1 and n-type FET Qn1 at the frequency of the sawtooth oscillating waveform. This supplies power to the discharge tube 3 and controls a current passing through the discharge tube 3 at a predetermined value.

A known related art is, for example, U.S. Pat. No. 5,615,093.

DISCLOSURE OF INVENTION

However, for a liquid crystal display unit such as a liquid crystal TV, a uniformity of screen brightness is important. In a liquid crystal display unit employing a panel with a plurality of discharge tubes, screen flickering occurs if the discharge tubes are lighted at different frequencies or different phases. It is necessary to supply a positive-negative symmetrical current to each discharge tube, and in addition, light the discharge tubes in the same phase.

A plurality of discharge tube lighting apparatuses each illustrated in FIG. 1 may be arranged with, for example, the capacitors C1 being connected to one another to synchronize the oscillation frequencies of the oscillators 12. Phases at the terminals DRV1 and DRV2, however, are indefinite due to timing differences to start operating the controllers IC1. This causes a phase reversal and there is a possibility of continuing operation in such a state.

If a phase reversal occurs in any one of the discharge tube lighting apparatuses during operation due to some reason, the operation will continue in such a state.

The present invention provides a synchronous operating system for discharge tube lighting apparatuses, a discharge tube lighting apparatus, and a semiconductor integrated circuit, capable of easily and stably operating a plurality of discharge tube lighting apparatuses at the same frequency and same phase only by connecting capacitors, which are connected to oscillators of the discharge tube lighting apparatuses, to one another.

Means to Solve the Problems

In order to solve the above-mentioned problems, the present invention provides a synchronous operating system for a plurality of discharge tube lighting apparatuses each converting a direct current into a positive-negative symmetrical alternating current, oscillator capacitors of the plurality of discharge tube lighting apparatuses being commonly connected, AC power from the plurality of discharge tube lighting apparatuses being supplied to a plurality of discharge tubes. Each of the plurality of discharge tube lighting apparatuses comprises a resonant circuit including a capacitor connected to at least one of primary and secondary windings of a transformer, an output thereof being connected to the discharge tube, a plurality of switching elements of bridge configuration connected to both ends of a DC power source, to pass a current through the primary winding of the transformer and the capacitor, an oscillator to generate a triangular wave signal whose inclination for charging the oscillator capacitor and inclination for discharging the same are the same and which is used to turn on/off the plurality of switching elements, a first signal generation part to generate, in a period shorter than a half period of the triangular wave signal, a first drive signal having a pulse width corresponding to a current passing through the discharge tube, to drive a first group of one or more switching elements among the plurality of switching elements and pass a current through the discharge tube, and a second signal generation part to generate a second drive signal having a pulse width substantially equal to that of the first drive signal and a phase difference of about 180 degrees with respect to the first drive signal, to drive a second group of one or more switching elements among the plurality of switching elements and pass a current through the discharge tube in a direction opposite to the current passed by the first drive signal.

Also, the present invention provides a discharge tube lighting apparatus for converting a direct current into a positive-negative symmetrical alternating current and supplying power to a discharge tube, comprising a resonant circuit including a capacitor connected to at least one of primary and secondary windings of a transformer, an output thereof being connected to the discharge tube, a plurality of switching elements of bridge configuration connected to both ends of a DC power source, to pass a current through the primary winding of the transformer and the capacitor, an oscillator to generate a triangular wave signal whose inclination for charging an oscillator capacitor and inclination for discharging the same are the same and which is used to turn on/off the plurality of switching elements, a first signal generation part to generate, in a period shorter than a half period of the triangular wave signal, a first drive signal having a pulse width corresponding to a current passing through the discharge tube, to drive a first group of one or more switching elements among the plurality of switching elements and pass a current through the discharge tube, and a second signal generation part to generate a second drive signal having a pulse width substantially equal to that of the first drive signal and a phase difference of about 180 degrees with respect to the first drive signal, to drive a second group of one or more switching elements among the plurality of switching elements and pass a current through the discharge tube in a direction opposite to the current passed by the first drive signal.

The present invention provides a semiconductor integrated circuit for controlling a plurality of switching elements of bridge configuration to supply power to a discharge tube, comprising an oscillator to generate a triangular wave signal whose inclination for charging an oscillator capacitor and inclination for discharging the same are the same and which is used to turn on/off the plurality of switching elements, a first signal generation part to generate, in a period shorter than a half period of the triangular wave signal, a first drive signal having a pulse width corresponding to a current passing through the discharge tube, to drive a first group of one or more switching elements among the plurality of switching elements and pass a current through the discharge tube, and a second signal generation part to generate a second drive signal having a pulse width substantially equal to that of the first drive signal and a phase difference of about 180 degrees with respect to the first drive signal, to drive a second group of one or more switching elements among the plurality of switching elements and pass a current through the discharge tube in a direction opposite to the current passed by the first drive signal.

BEST MODE OF IMPLEMENTING INVENTION

Synchronous operating systems for discharge tube lighting apparatuses, discharge tube lighting apparatuses, and semiconductor integrated circuits according to embodiments of the present invention will be explained in detail with reference to the drawings.

Embodiment 1

Figure 1:
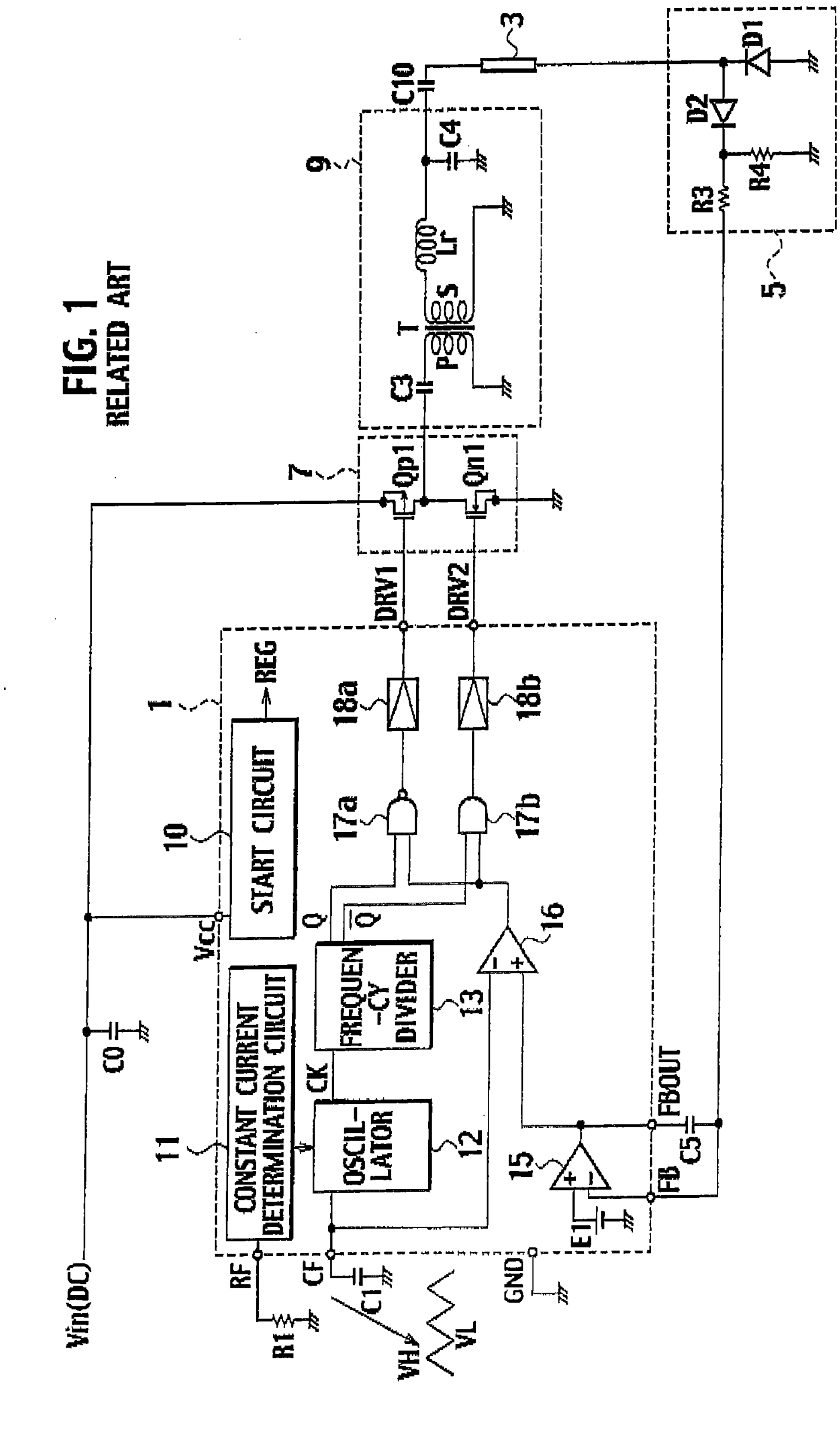
FIG. 1 RELATED ART
FIG. 1 is a circuit diagram illustrating a configuration of a related discharge tube lighting apparatus.
Figure 2:
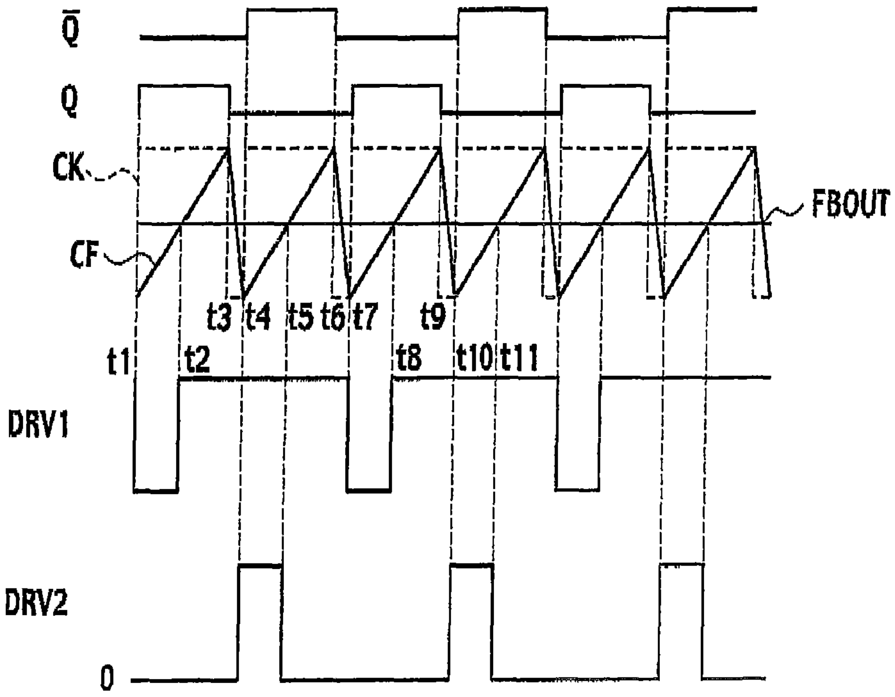
FIG. 2 RELATED ART
FIG. 2 is a timing chart illustrating signals at various parts of the related discharge tube lighting apparatus.
Figure 3:
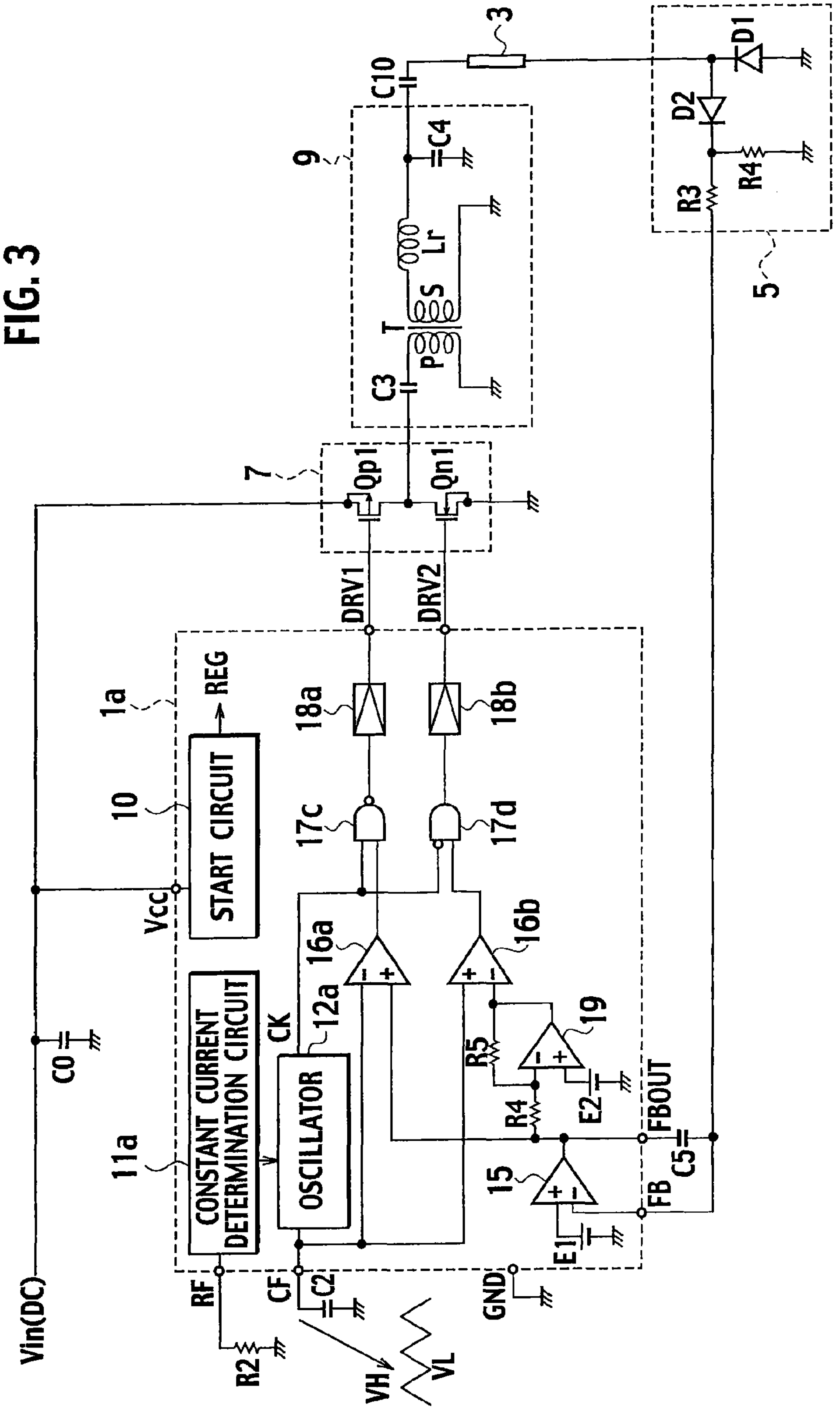
FIG. 3 is a circuit diagram illustrating a configuration of a discharge tube lighting apparatus according to Embodiment 1 of the present invention.

FIG. 3 is a circuit diagram illustrating a configuration of a discharge tube lighting apparatus according to Embodiment 1 of the present invention. The discharge tube lighting apparatus illustrated in FIG. 3 differs from the discharge tube lighting apparatus illustrated in FIG. 1 only by an integrated circuit 1*a* as a controller. The remaining configuration illustrated in FIG. 3 is the same as that illustrated in FIG. 1, and therefore, the same parts are represented with like reference marks to omit their explanations. Only the different part will be explained here.

Between a reactor Lr and a discharge tube 3, there is connected a capacitor C10. This example employs both a capacitor C3 and the capacitor C10. For example, only one of the capacitors C3 and C10 may be employed.

The controller 1*a* corresponds to the semiconductor integrated circuit of the present invention and has a start circuit 10, a constant current determination circuit 11*a*, an oscillator 12*a*, an error amplifier 15, a subtraction circuit 19, PWM comparators 16*a* and 16*b*, a NAND gate 17*c*, a logic circuit 17*d*, and drivers 18*a* and 18*b*. A configuration of the start circuit 10 is the same as that illustrated in FIG. 15. The constant current determination circuit 11*a* is connected through a terminal RF to an end of a constant current determination resistor R2. The oscillator 12*a* is connected through a terminal CF to an end of a capacitor C2.

Figure 4:
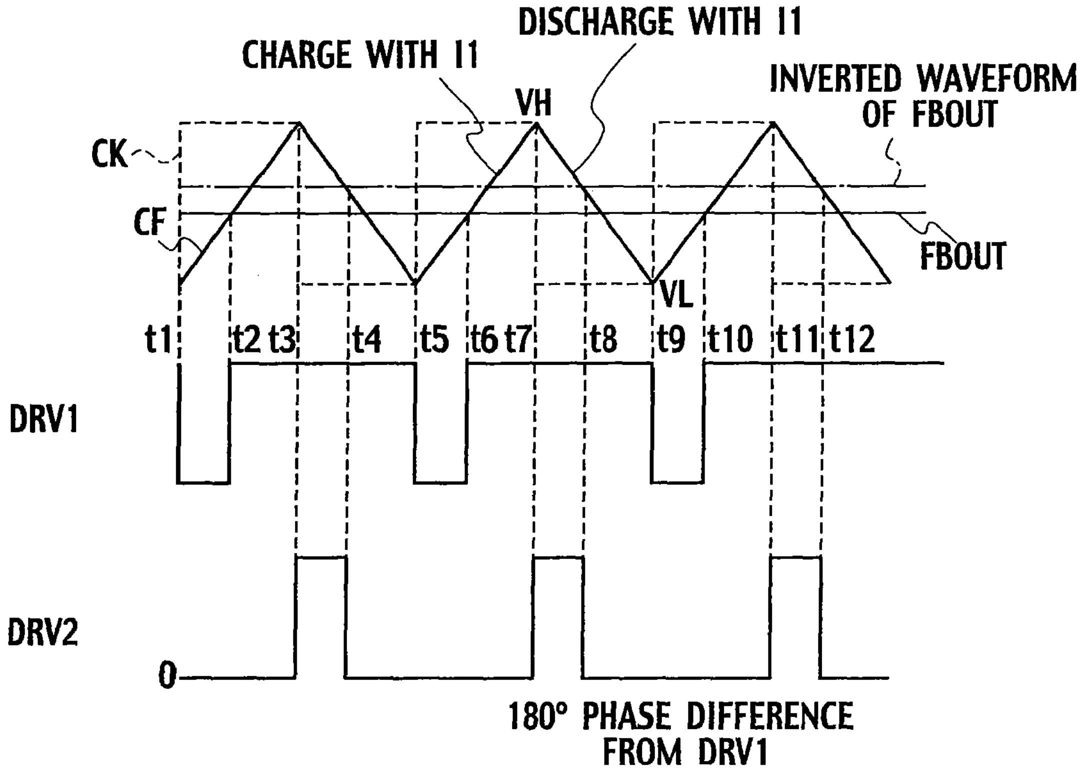
FIG. 4 is a timing chart illustrating signals at various parts of the discharge tube lighting apparatus according to Embodiment 1 of the present invention.

The constant current determination circuit 11*a* passes a constant current that is optionally set by the constant current determination resistor R2. The oscillator 12*a* charges and discharges the capacitor C2 with the constant current from the constant current determination circuit 11*a*, generates a triangular wave signal as illustrated in FIG. 4 (illustrated in FIG. 4 is a charge/discharge voltage of the capacitor C2 at the terminal CF), and based on the triangular wave signal, generates a clock CK to be sent to the NAND gate 17*c* and logic circuit 17*d*. The triangular wave signal has the same rise and fall inclinations. The rise and fall inclinations are set according to a value of the capacitor C2 and a value of the resistor R2.

An output terminal of the error amplifier 15 is connected to a non-inverting terminal (as depicted by "+") of the PWM comparator 16*a* and through a resistor R4 to an inverting terminal (as depicted by "−") of the subtraction circuit 19. Between the inverting terminal and an output terminal of the subtraction circuit 19, there is connected a resistor R5. The subtraction circuit 19 inverts an error voltage FBOUT received from the error amplifier 15 through the resistor R4 with respect to a reference voltage E2 at a non-inverting terminal thereof (as depicted by "+") representing a midpoint potential between an upper limit VH and a lower limit VL of the triangular wave signal and thereby the subtraction circuit 19 outputs the inverted voltage representing an inverted waveform of the error voltage FBOUT to an inverting terminal (as depicted by "−") of the PWM comparator 16*b*. The reference voltage E2 is expressed as E2=(VL+VH)/2 and is a midpoint potential between the upper limit value VH and lower limit value VL of the triangular wave signal CF.

The PWM comparator 16*a* generates a pulse signal that is high level when the error voltage FBOUT input to the non-inverting terminal from the error amplifier 15 is equal to or higher than the triangular wave signal voltage input to the inverting terminal from the terminal CF and low level when the error voltage FBOUT is lower than the triangular wave signal voltage and outputs the pulse signal to the NAND gate 17*c*. The PWM comparator 16*b* generates a pulse signal that is high level when the triangular wave signal voltage input to the non-inverting terminal from the terminal CF is equal to or higher than the inverted waveform voltage of the error voltage FBOUT input to the inverting terminal from the subtraction circuit 19 and low level when the triangular wave signal voltage is lower than the inverted waveform voltage of the error voltage FBOUT and outputs the pulse signal to the logic circuit 17*d*.

The NAND gate 17*c* operates the NAND function of the clock from the oscillator 12*a* and the signal from the PWM comparator 16*a* and outputs a first drive signal through the driver 18*a* and a terminal DRV1 to a p-type FET Qp1. The logic circuit 17*d* operates the AND function of an inverted signal of the clock from the oscillator 12*a* and the signal from the PWM comparator 16*b* and outputs a second drive signal through the driver 18*b* and a terminal DRV2 to an n-type FET Qn1.

The PWM comparator 16*a*, NAND gate 17*c*, and driver 18*a* correspond to the first signal generation part of the present invention that generates, in a period shorter than a half period of the triangular wave signal, the first drive signal having a pulse width corresponding to a current passing through the discharge tube 3, to drive the p-type FET Qp1 and pass a current through the discharge tube 3. The subtraction circuit 19, PWM comparator 16*b*, logic circuit 17*d*, and driver 18*b* correspond to the second signal generation part of the present invention that generates the second drive signal having a pulse width substantially equal to that of the first drive signal and a phase difference of about 180 degrees with respect to the first drive signal, to drive the n-type FET Qn1 and pass a current through the discharge tube 3 in a direction opposite to the current passed by the first drive signal.

Operation of the discharge tube lighting apparatus of Embodiment 1 having such a configuration will be explained with reference to the timing chart illustrated in FIG. 4.

The constant current I1 optionally set by the constant current determination resistor R2 makes the oscillator 12*a* charge/discharge the capacitor C2, to generate the triangular wave signal CF whose rise inclination and fall inclination are the same, and based on the triangular wave signal CF, generate the clock CK. The clock CK is a pulse signal that is synchronized with the triangular wave signal and is, for example, high level during a rise period and low level during a fall period.

Only when the clock CK from the oscillator 12*a* is high level and the signal from the PWM comparator 16*a* is high level, the NAND gate 17*c* outputs a low-level pulse signal to the p-type FET Qp1 to turn on the same. Namely, within a rise period of the triangular wave signal CF (for example, time t1 to t3, or t5 to t7 with the clock CK being high level), if the error voltage FBOUT from the error amplifier 15 is equal to or higher than the triangular wave signal CF (for example, time t1 to t2, or t5 to t6 with the signal from the PWM comparator 16*a* being high level, i.e., a period in which the triangular wave signal CF advances from the lower limit value VL and crosses the output from the error amplifier 15), the low-level pulse signal is outputted to the p-type FET Qp1. Namely, the pulse signal is sent to the terminal DRV1 only in a rise period of the triangular wave signal CF.

For example, from time t1 to t2, a current passes through a path extending along Vin, Qp1, C3, P, and GND, and on the secondary side of the transformer T, a current passes through a path extending along S, Lr, the discharge tube 3, and a tube current detection circuit 5.

On the other hand, the subtraction circuit 19 provides the inverting terminal of the PWM comparator 16*b* with an inverted waveform of the error voltage FBOUT formed by inverting the error voltage FBOUT from the error amplifier 15 with respect to the midpoint potential between the upper limit value and lower limit value of the triangular wave signal. Only when the inverted output of the clock CK (low level) from the oscillator 12*a* is high level and the signal from the PWM comparator 16*b* is high level, the logic circuit 17*d* outputs a high-level pulse signal to the n-type FET Qn1 to turn on the same.

Namely, in a fall period of the triangular wave signal CF (for example, time t3 to t5, or t7 to t9 with the clock CK being low level), when the triangular wave signal CF is equal to or higher than the inverted waveform voltage of the error voltage FBOUT (a period in which the signal from the PWM comparator 16*b* is high level, i.e., a period in which the triangular wave signal CF advances from the upper limit value VH of the triangular wave signal CF and crosses the inverted output of the error amplifier, for example, time t3 to t4, or t7 to t8), the high-level pulse signal is output to the n-type FET Qn1. Namely, the pulse signal is sent to the terminal DRV2 only in a fall period of the triangular wave signal CF.

From time t3 to t4, for example, a current passes through a path extending along P, C3, Qn1, and GND, and on the secondary side of the transformer T, a current passes through a path extending along the tube current detector 5, the discharge tube 3, Lr, and S.

According to the above-mentioned operation, the controller 1*a* uses the first drive signal and the second drive signal whose pulse width is substantially equal to that of the first drive signal and which has a phase difference of about 180 degrees with respect to the first drive signal, to alternately turn on/off the p-type FET Qp1 and n-type FET Qn1 at the frequency of the triangular wave signal CF whose rise inclination period and fall inclination period are the same, thereby supplying power to the discharge tube 3 and controlling a current passed through the discharge tube 3 to a predetermined value.

Embodiment 2

Figure 5:
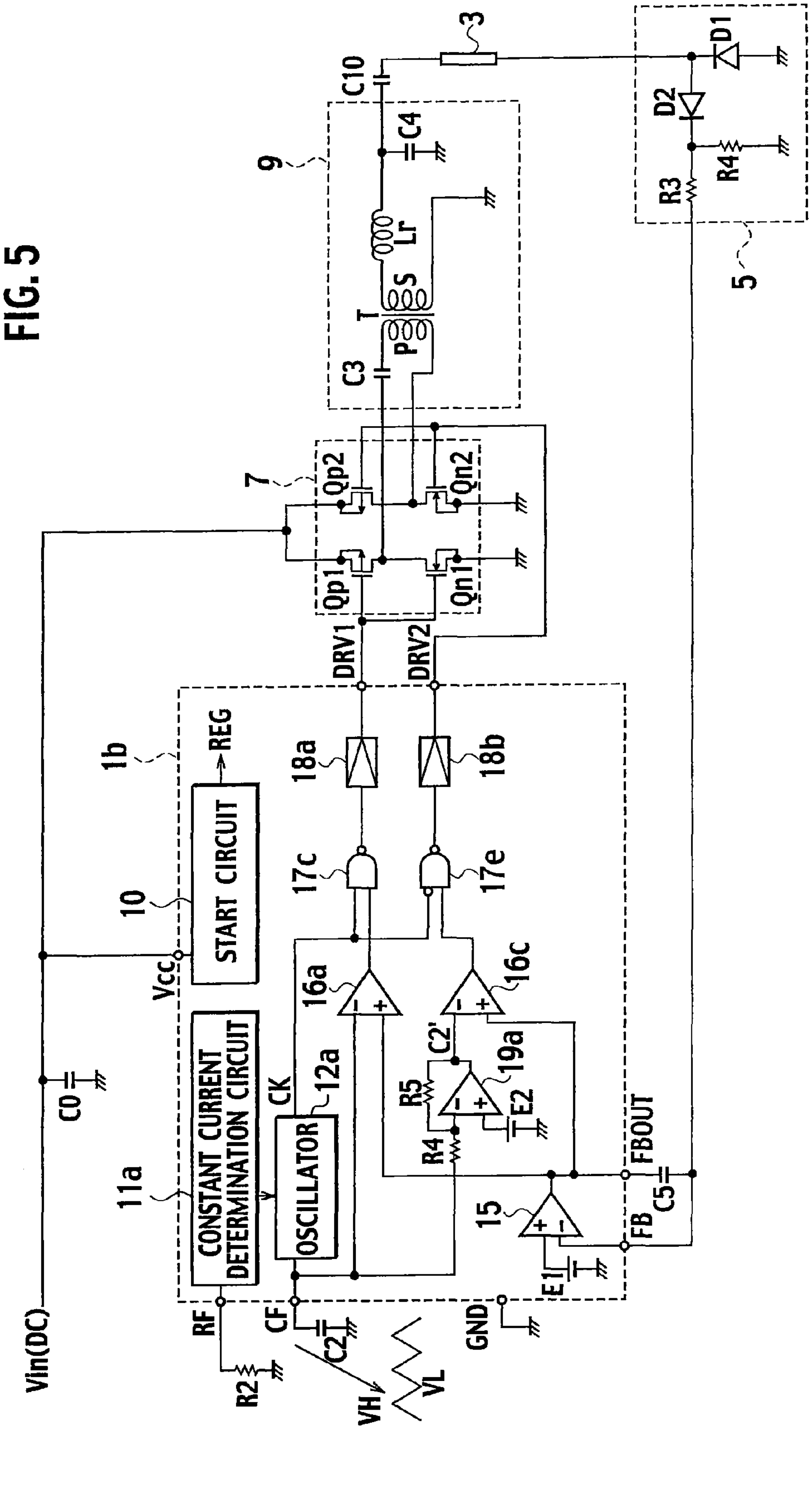
FIG. 5 is a circuit diagram illustrating a configuration of a discharge tube lighting apparatus according to Embodiment 2 of the present invention.

FIG. 5 is a circuit diagram illustrating a configuration of a discharge tube lighting apparatus according to Embodiment 2 of the present invention. The discharge tube lighting apparatus illustrated in FIG. 5 is an example of a discharge tube lighting apparatus employing a full-bridge circuit composed of four switching elements. Embodiment 2 illustrated in FIG. 5 differs from Embodiment 1 illustrated in FIG. 3 in that it employs a p-type FET Qp2, an n-type FET Qn2, a subtraction circuit 19*a*, and a PWM comparator 16*c*.

Between a DC power source Vin and the ground, there is connected a series circuit consisting of the high-side p-type FET Qp2 and low-side n-type FET Qn2. Between a connection point of a p-type FET Qp1 and an n-type FET Qn1 and a connection point of the p-type FETQp2 and n-type FET Qn2, there is connected a series circuit having a capacitor C3 and a primary winding P of a transformer T. A terminal DRV1 is connected to a gate of the p-type FET Qp1 and a gate of the n-type FET Qn1 and a terminal DRV2 is connected to a gate of the p-type FET Qp2 and a gate of the n-type FET Qn2.

The subtraction circuit 19*a* provides an inverting terminal (as depicted by "−") of the PWM comparator 16*c* with an inverted voltage C2' formed by inverting a triangular wave signal CF with respect to a reference voltage E2 to a non-inverting terminal thereof (as depicted by "+") representing a midpoint potential between an upper limit value VH and a lower limit value VL of the triangular wave signal. The reference voltage E2 is expressed as E2=(VL+VH)/2 and is the midpoint potential between the upper limit value VH and lower limit value VL of the triangular wave signal.

The PWM comparator 16*c* generates a pulse signal that is high level when an error voltage FBOUT inputted to a non-inverting terminal (as depicted by "+") from an error amplifier 15 is equal to or higher than the inverted voltage C2' input to the inverting terminal from the subtraction circuit 19*a* and low level when the error voltage FBOUT is lower than the inverted voltage C2' and outputs the pulse signal to a logic circuit 17*e*. The logic circuit 17*e* operates a NAND of an inversion of a clock CK from an oscillator 12*a* and the signal from the PWM comparator 16*c* and outputs the operation result.

If the error voltage FBOUT from the error amplifier 15 is equal to or higher than the triangular wave signal CF in a rise period of the triangular wave signal CF, this configuration outputs a low-level pulse signal to the p-type FET Qp1 and n-type FET Qn1, to turn on the p-type FET Qp1. In the rise period of the triangular wave signal CF, a high-level pulse signal is outputted to the p-type FET Qp2 and n-type FET Qn2, to turn on the n-type FET Qn2. In this period, a current passes through a path extending along Vin, Qp1, C3, P, Qn2, and GND, and on the secondary side of the transformer T, a current passes through a path extending along S, Lr, a discharge tube 3, and a current detection circuit 5.

On the other hand, in a fall period of the triangular wave signal CF, a high-level pulse signal is outputted to the p-type FET Qp1 and n-type FET Qn1, to turn on the n-type FET Qn1. Also in the fall period of the triangular wave signal CF, a high-level pulse signal is output to the logic circuit 17*e* when the error voltage FBOUT is equal to or higher than the inverted voltage C2' from the subtraction circuit 19*a*. The logic circuit 17*e* outputs a low-level signal to the p-type FET Qp2 and n-type FET Qn2, to turn on the p-type FET Qp2.

During this period, a current passes through a path extending along Vin, Qp2, P, C3, Qn1, and GND, and on the secondary side of the transformer T, a current passes through a path extending along the tube current detection circuit 5, the discharge tube 3, Lr, and S.

Consequently, the discharge tube lighting apparatus of Embodiment 2 employing the full-bridge circuit can provide an effect similar to that provided by the discharge tube lighting apparatus of Embodiment 1.

Modification of Embodiment 2

Figure 6:
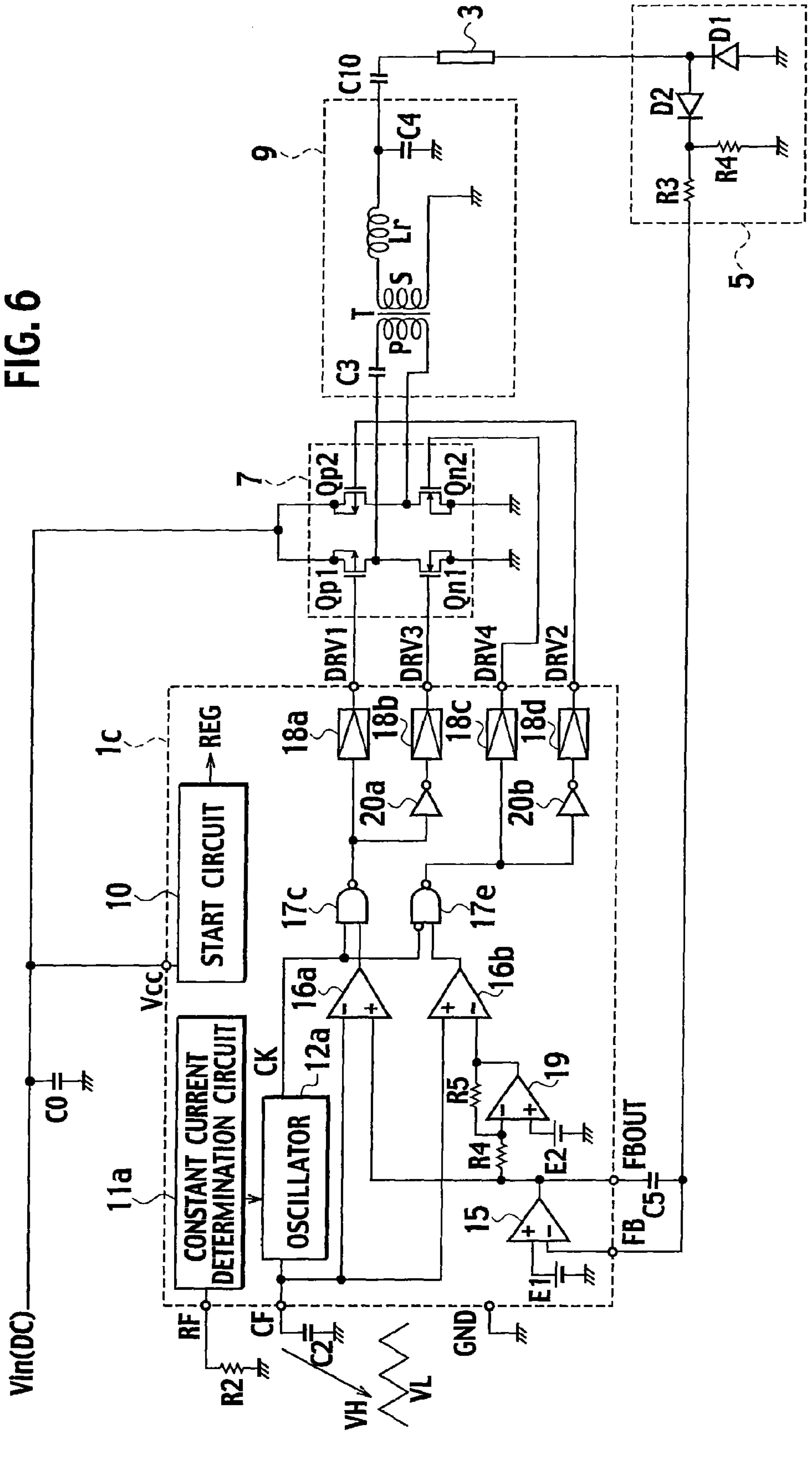
FIG. 6 is a circuit diagram illustrating a configuration of a discharge tube lighting apparatus according to a modification of Embodiment 2 of the present invention.

FIG. 6 is a circuit diagram illustrating a discharge tube lighting apparatus according to a modification of Embodiment 2 of the present invention. The modification of Embodiment 2 illustrated in FIG. 6 differs from Embodiment 2 illustrated in FIG. 5 in that an integrated circuit 1*c* as a controller has drivers 18*a* to 18*d* and inverters 20*a* and 20*b*. An output of the driver 18*a* is connected through a terminal DRV1 to a gate of a p-type FET Qp1, an output of the driver 18*b* is connected through a terminal DRV3 to a gate of an n-type FET Qn1, an output of the driver 18*c* is connected through a terminal DRV4 to a gate of an n-type FET Qn2, and an output of the driver 18*d* is connected through a terminal DRV2 to a gate of a p-type FET Qp2. The inverter 20*a* inverts an output from a NAND gate 17*c* and outputs the result to the driver 18*b*. The inverter 20*b* inverts an output from a logic circuit 17*e* and outputs the result to the driver 18*d*.

The driver 18*a* corresponds to the first signal generation part of the present invention, the driver 18*b* to the second signal generation part of the present invention, the driver 18*c* to the third signal generation part of the present invention, and the driver 18*d* to the fourth signal generation part of the present invention.

Such a discharge tube lighting apparatus according to the modification of Embodiment 2 can provide operation and effect similar to those provided by the discharge tube lighting apparatus of Embodiment 2.

Embodiment 3

Figure 7:
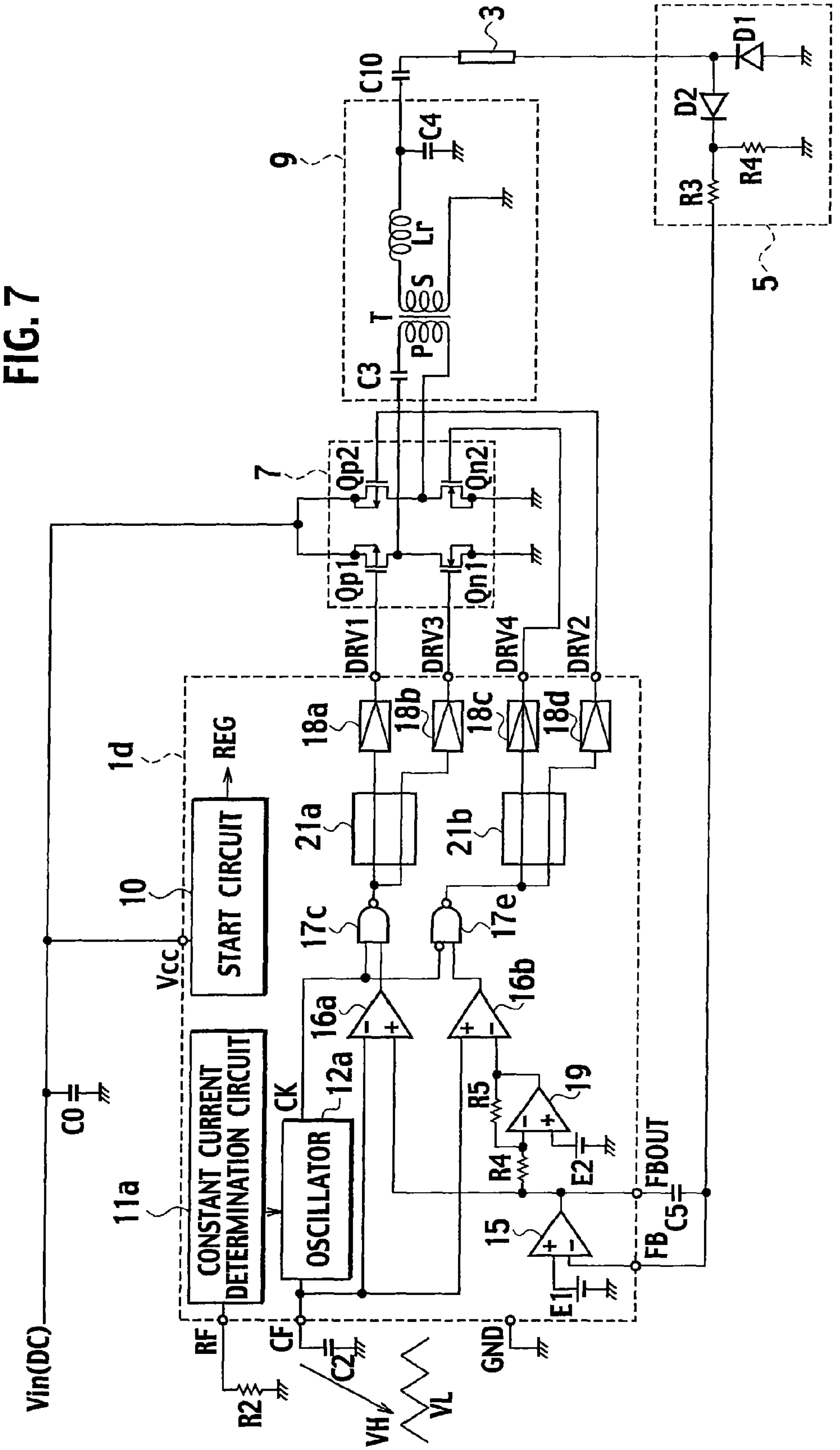
FIG. 7 is a circuit diagram illustrating a configuration of a discharge tube lighting apparatus according to Embodiment 3 of the present invention.

FIG. 7 is a circuit diagram illustrating a discharge tube lighting apparatus according to Embodiment 3 of the present invention. The discharge tube lighting apparatus illustrated in FIG. 7 is an example of a discharge tube lighting apparatus with a full-bridge circuit and is different from the modification of Embodiment 2 illustrated in FIG. 6 in that an integrated circuit 1*d* as a controller employs dead time creation circuits 21*a* and 21*b* instead of the inverters 20*a* and 20*b* of the controller IC1*c*.

The dead time creation circuit 21*a* creates, based on a signal from a NAND gate 17*c*, a third drive signal DRV3 having a predetermined dead time DT relative to a first drive signal DRV1 to a driver 18*a* and outputs the signal to a driver 18*b*. The dead time creation circuit 21*b* creates, based on a signal from a logic circuit 17*e*, a second drive signal DRV2 having the predetermined dead time DT relative to a fourth drive signal DRV4 to a driver 18*c* and outputs the signal to a driver 18*d*.

The first and third drive signals and the second and fourth drive signals have the dead time DT to prevent simultaneous ON operation. Except the dead time DT, the third drive signal is substantially the same as the first drive signal and the fourth drive signal as the second drive signal.

Figure 8:
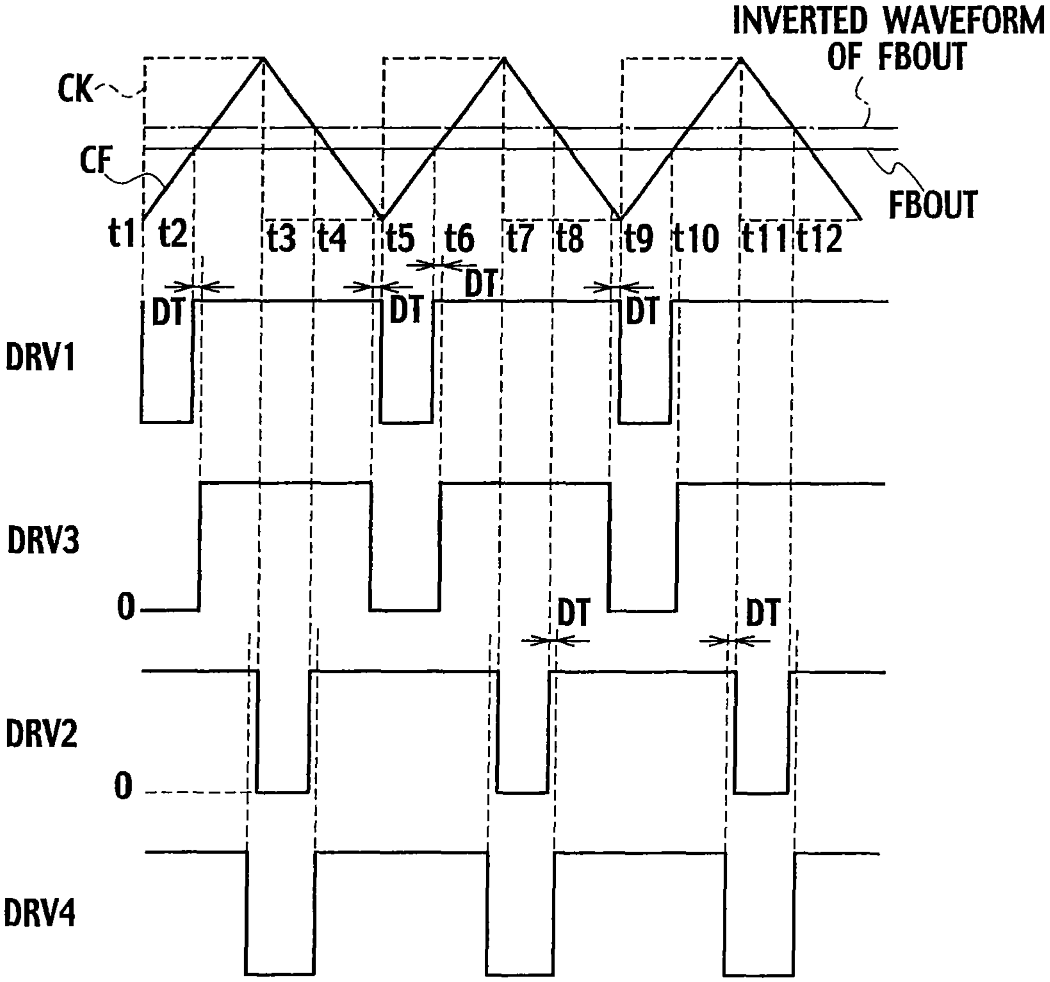
FIG. 8 is a timing chart illustrating signals at various parts of the discharge tube lighting apparatus according to Embodiment 3 of the present invention.

FIG. 8 is a timing chart illustrating signals at various parts of the discharge tube lighting apparatus according to Embodiment 3 of the present invention. The discharge tube lighting apparatus of Embodiment 3 employing the full-bridge circuit can provide operation and effect similar to those provided by the discharge tube lighting apparatus of Embodiment 2.

Figure 9:
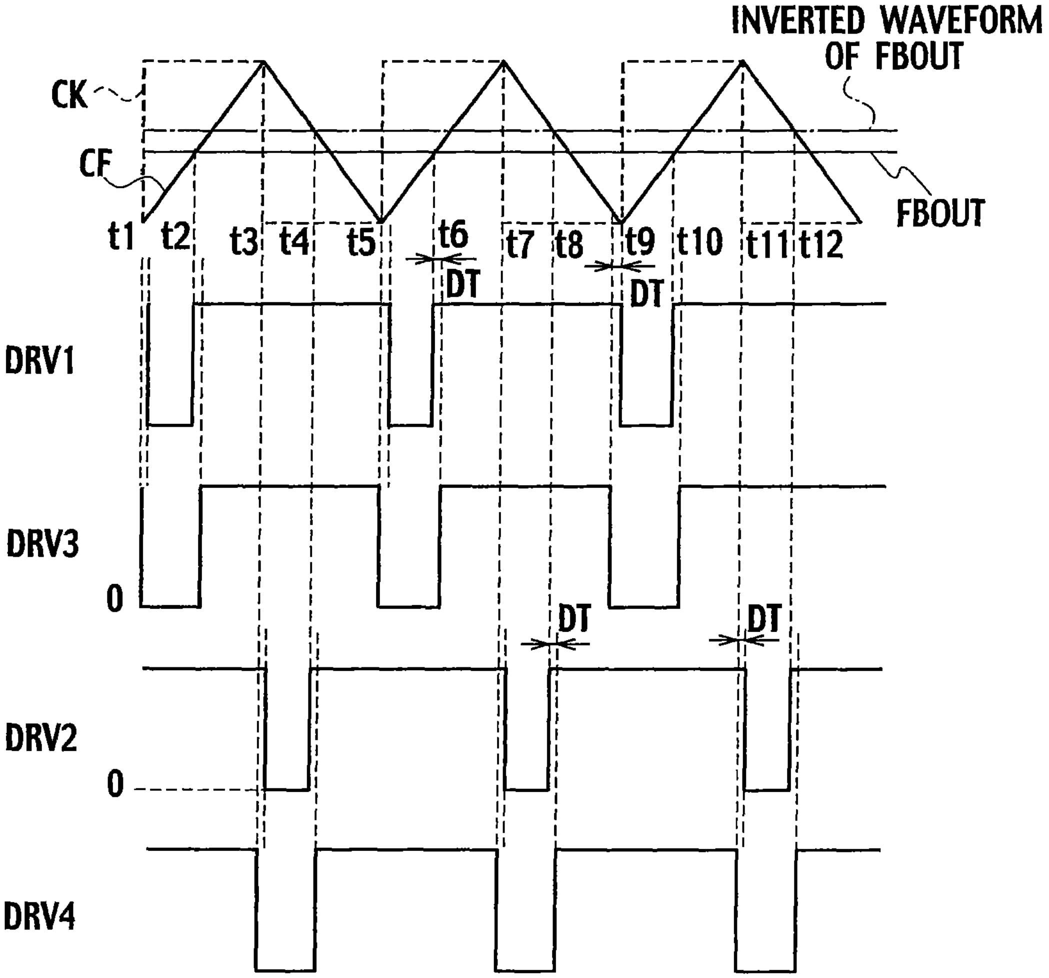
FIG. 9 is a timing chart illustrating signals at various parts of a discharge tube lighting apparatus according to a modification of Embodiment 3 of the present invention.

FIG. 9 is a timing chart illustrating signals at various parts of a discharge tube lighting apparatus according to a modification of Embodiment 3 of the present invention. The modification of Embodiment 3 illustrated in FIG. 9 has the same circuit configuration as the discharge tube lighting apparatus of Embodiment 3 illustrated in FIG. 7 and only differs therefrom in the timing of dead time DT. The other operations of the modification are the same as those of Embodiment 3, and therefore, explanations thereof are omitted.

(Synchronous Operating System for Discharge Tube Lighting Apparatuses)

Figure 10:
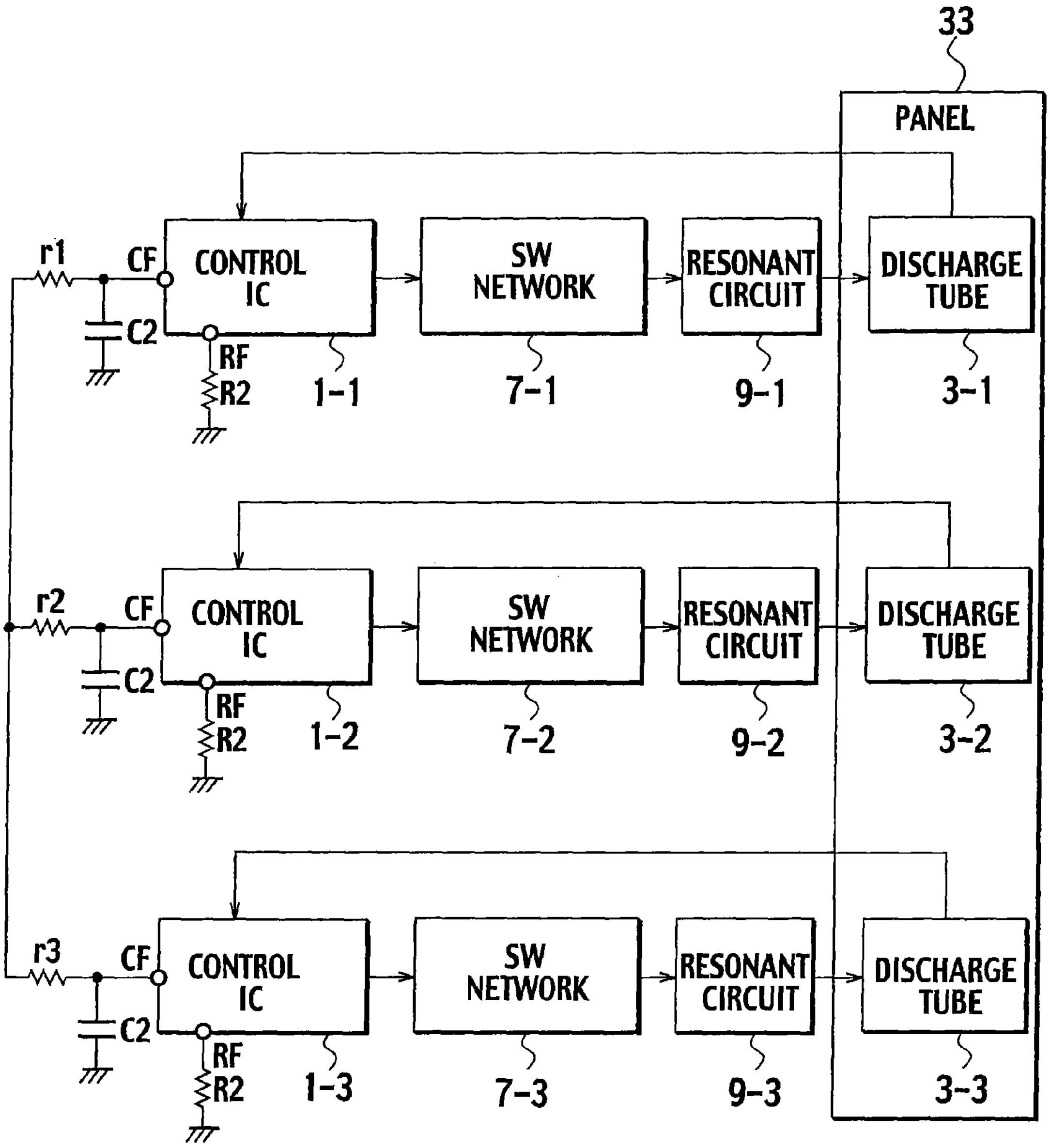
FIG. 10 is a circuit diagram illustrating a configuration of a synchronous operating system for discharge tube lighting apparatuses according to the present invention.

FIG. 10 is a circuit diagram illustrating a configuration of a synchronous operating system for discharge tube lighting apparatuses according to the present invention. In FIG. 10, the discharge tube lighting apparatuses have controllers (Control ICs) 1-1 to 1-3, SW networks 7-1 to 7-3, and resonant circuits 9-1 to 9-3, to turn on discharge tubes 3-1 to 3-3 arranged side by side on a panel 33. In each of the controllers 1-1 to 1-3, a terminal RF is connected to a constant current determination resistor R2 and a terminal CF is connected to a capacitor C2. The capacitors C2 are commonly connected.

Commonly connecting the capacitors C2 as mentioned above can synchronize the ON/OFF frequencies and phases of the SW networks 7-1 to 7-3 composed of a plurality of MOSFETs. Namely, the rise inclination and fall inclination of each triangular wave signal are the same, each first drive signal becomes active in the rise inclination period, and each second drive signal becomes active in the fall inclination period, to synchronize the phases.

In this case, the number of the capacitors C2 may be equal to the number of the discharge tube lighting apparatuses, or may be one whose capacitance is equal to a combined capacitance of the capacitors C2 (i.e. a capacitance obtained by multiplying the capacitance of each capacitor C2 by the number of the discharge tube lighting apparatuses).

Further, the terminals CF may be connected together through resistors r1 to r3. This may prevent a malfunction due to noise.

Also, the constant current determination resistor R2 may be connected to every discharge tube lighting apparatus. The constant current determination resistor R2 may be connected to only one discharge tube lighting apparatus, so that the remaining discharge tube lighting apparatuses are not connected to the constant current determination resistors R2, not to pass charge/discharge currents through the capacitors C2.

Embodiment 4

Figure 11:
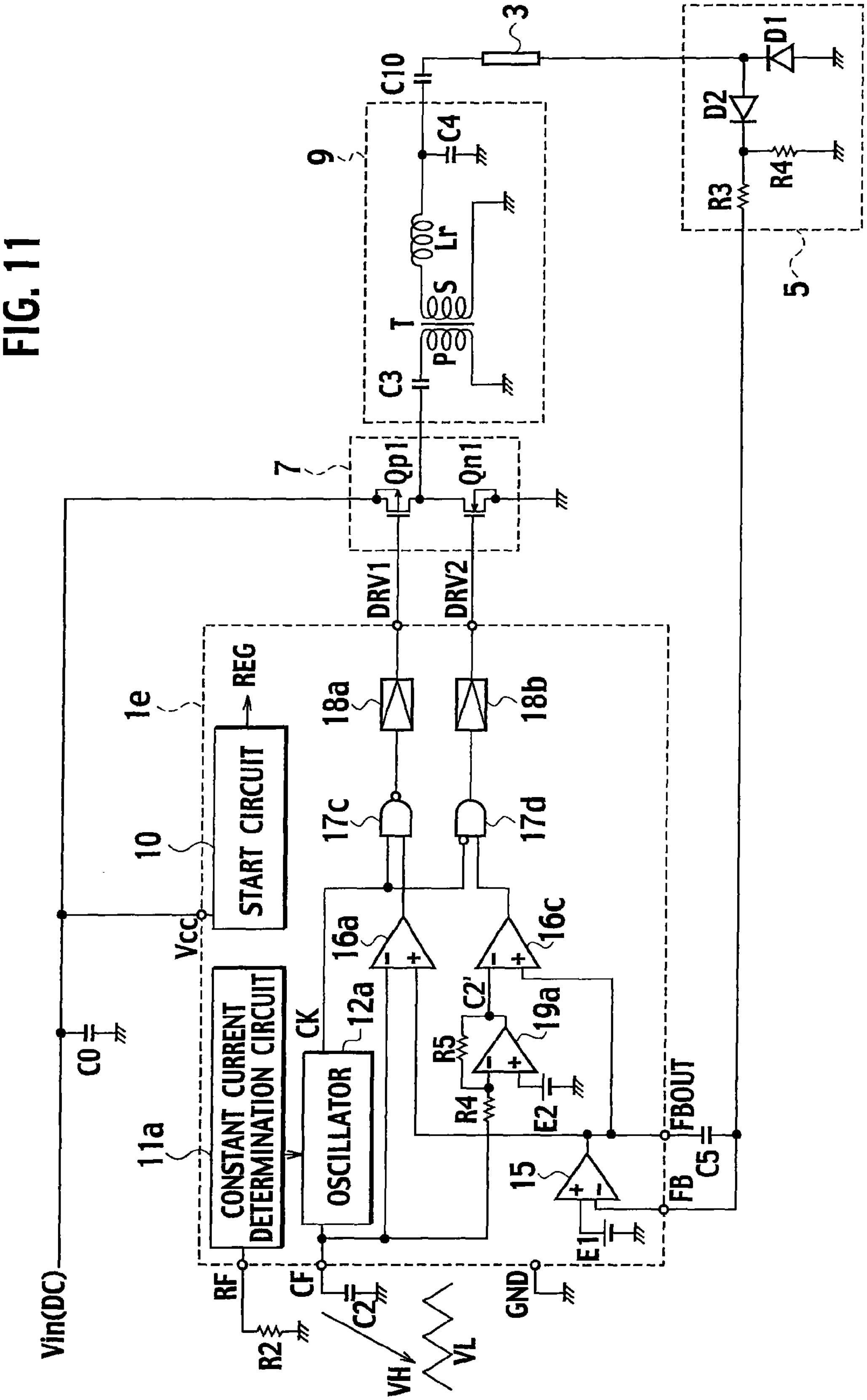
FIG. 11 is a circuit diagram illustrating a configuration of a discharge tube lighting apparatus according to Embodiment 4 of the present invention.

FIG. 11 is a circuit diagram illustrating a configuration of a discharge tube lighting apparatus according to Embodiment 4 of the present invention. Embodiment 4 illustrated in FIG. 11 differs from Embodiment 1 illustrated in FIG. 3 in that it has a subtraction circuit 19*a* and a PWM comparator 16*c*.

The subtraction circuit 19*a* provides an inverting terminal (as depicted by "−") of the PWM comparator 16*c* with an inverted voltage C2' formed by inverting a triangular wave signal CF with respect to a reference voltage E2 to a non-inverting terminal (as depicted by "+") representing a mid-point potential between an upper limit value VH and a lower limit value VL of the triangular wave signal. The reference voltage E2 is expressed as E2=(VL+VH)/2 and is the mid-point potential between the upper limit value VH and lower limit value VL of the triangular wave signal.

The PWM comparator 16*c* generates a pulse signal that is high level when an error voltage FBOUT input to a non-inverting terminal (as depicted by "+") from an error amplifier 15 is equal to or higher than the inverted voltage C2' input to the inverting terminal from the subtraction circuit 19*a* and outputs the pulse signal to a logic circuit 17*d*. The logic circuit 17*d* operates a NAND logic of an inverted output of a clock CK from an oscillator 12*a* and the signal from the PWM comparator 16*c*.

Figure 12:
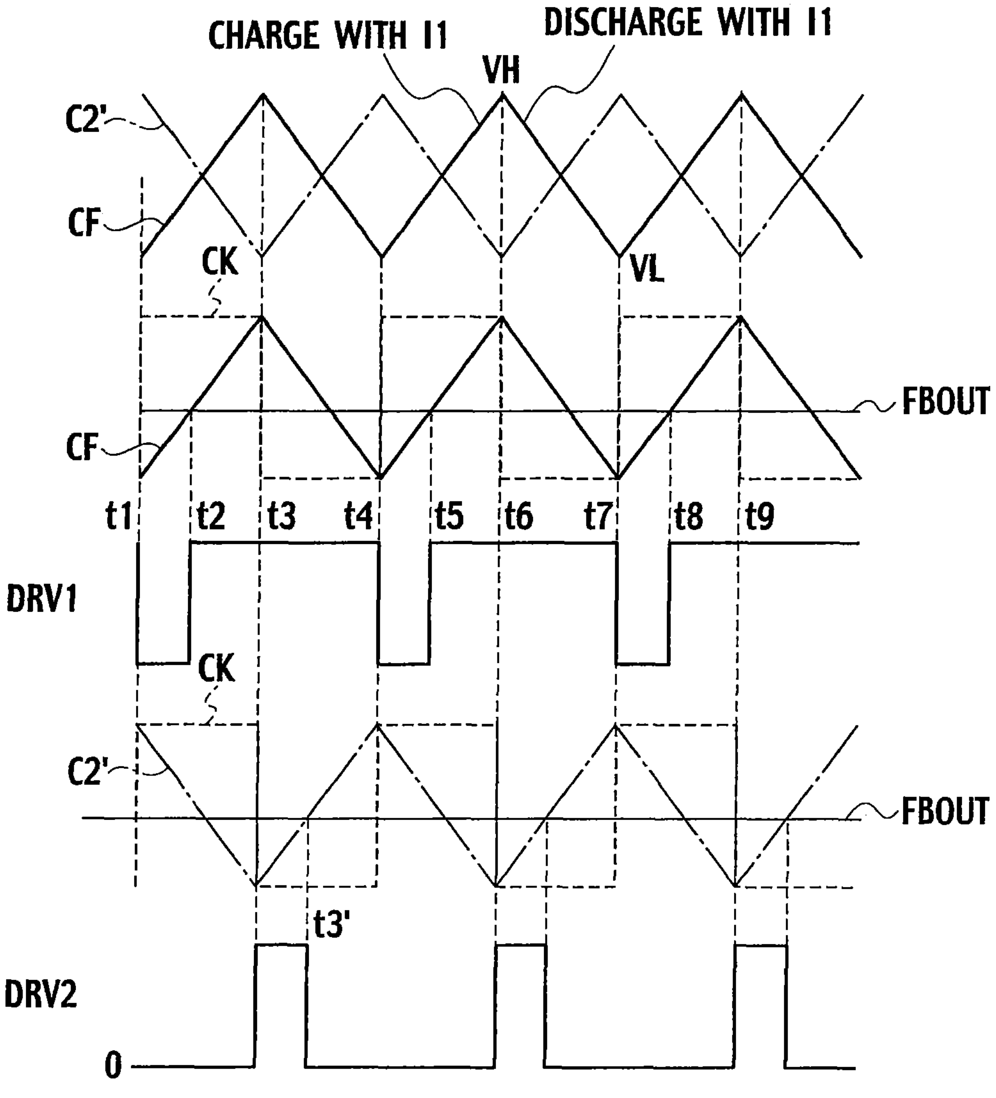
FIG. 12 is a timing chart illustrating signals at various parts of the discharge tube lighting apparatus according to Embodiment 4 of the present invention.

Operation of the discharge tube lighting apparatus according to Embodiment 4 of the present invention will be explained with reference to a timing chart illustrated in FIG. 12.

First, in a rise period (for example, t1 to t3) of the triangular wave signal CF, when the error voltage FBOUT from the error amplifier 15 is equal to or higher than the triangular signal CF (for example, t1 to t2), a low-level pulse signal is output to a p-type FET Qp1 to turn on the p-type FET Qp1. In this period, a current passes through a path extending along Vin, Qp1, C3, P, and GND, and on the secondary side of a transformer T, a current passes through a route extending along S, Lr, a discharge tube 3, and a tube current detection circuit 5.

On the other hand, in a fall period of the triangular wave signal CF (e.g. t3 to t4), a high-level pulse signal is output to the p-type FET Qp1 to turn off the same. Also in the fall period of the triangular wave signal CF, when the error voltage FBOUT is equal to or higher than the inverted voltage C2' from the subtraction circuit 19*a*, that is, a period in which the inverted signal C2' of the triangular wave signal CF advances from the lower limit value of the inverted signal C2' of the triangular wave signal CF and crosses the output FBOUT of the error amplifier 15 (e.g. t3 to t3'), a high-level pulse signal is outputted to the logic circuit 17*d*, which outputs a high-level signal to an n-type FET Qn1 to turn on the n-type FET Qn1.

In this period, a current passes through a path extending along P, C3, Qn1, and GND, and on the secondary side of the transformer T, a current passes through a path extending along the tube current detection circuit 5, the discharge tube 3, Lr, and S.

Consequently, the discharge tube lighting apparatus of Embodiment 4 employing the half-bridge circuit can provide an effect similar to that provided by the discharge tube lighting apparatus of Embodiment 1.

In FIG. 11, the SW network is a half-bridge circuit. For the discharge tube lighting apparatus illustrated in FIG. 11, the SW network may be a full-bridge circuit and the dead time creation circuits 21*a* and 21*b* and drivers 18*a* to 18*d* illustrated in FIG. 7 may be added to provide four outputs.

Embodiment 5

Figure 13:
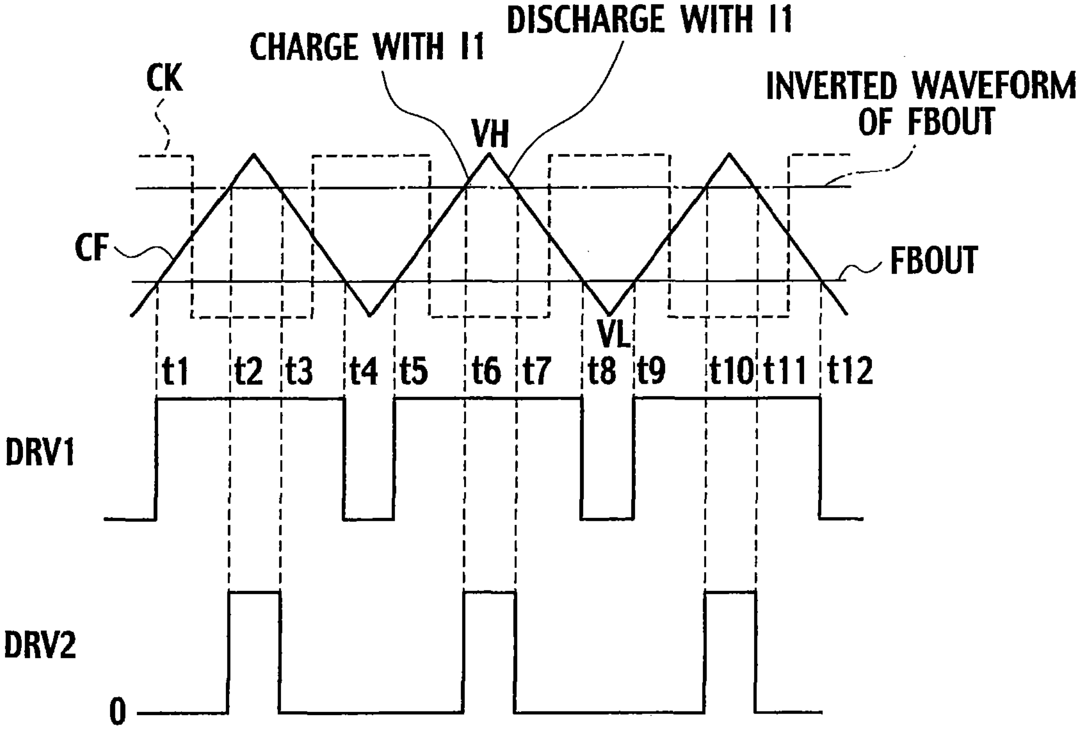
FIG. 13 is a timing chart illustrating signals at various parts of a discharge tube lighting apparatus according to Embodiment 5 of the present invention.

FIG. 13 is a timing chart illustrating signals at various parts of a discharge tube lighting apparatus according to Embodiment 5 of the present invention. A basic circuit configuration thereof is the same as that of the discharge tube lighting apparatus illustrated in FIG. 3 but it differs therefrom in that the timing of a clock CK from an oscillator 12*a* relative to a triangular wave signal CF differs from that illustrated in FIG. 4.

Namely, according to Embodiment 5 illustrated in FIG. 13, the clock CK has a pulse voltage waveform that is synchronized with the triangular wave signal CF and is high level in a period in which potential of the triangular wave signal CF is lower than a midpoint potential between an upper limit VH and a lower limit VL and low level in a period in which potential of the triangular wave signal CF is higher than the midpoint potential.

A NAND gate 17*c* outputs, only when the clock CK from the oscillator 12*a* is high level and a signal from a PWM comparator 16*a* is high level, a low-level pulse signal to a p-type FET Qp1 to turn on the same. Namely, in a period in which potential of the triangular wave signal CF is lower than the midpoint potential between the upper limit and the lower limit, that is, the clock CK is high level, and an error voltage FBOUT from an error amplifier 15 is equal to or higher than the triangular wave signal CF, that is, the signal from the PWM comparator 16*a* is high level (e.g. time t4 to t5, or t8 to t9), then the low-level pulse signal is outputted to the p-type FET Qp1. Namely, the pulse signal is sent to a terminal DRV1 only in the period in which potential of the triangular wave signal CF is lower than the midpoint potential between the upper limit and the lower limit.

On the other hand, a subtraction circuit 19 provides an inverting terminal (as depicted by "−") of a PWM comparator 16*b* with an inverted waveform of the error voltage FBOUT formed by inverting the error voltage FBOUT from the error amplifier 15 with respect to the midpoint potential between the upper limit and lower limit of the triangular wave signal. A logic circuit 17*d* outputs, only when an inverted output of the clock CK (low level) from the oscillator 12 is high level and the signal from the PWM comparator 16*b* is high level, a high-level pulse signal to an n-type FET Qn1 to turn on the same.

Namely, in a period in which potential of the triangular wave signal CF is higher than the midpoint potential between the upper limit and the lower limit, that is, the clock CK is low level, and the triangular wave signal CF is equal to or higher than the inverted waveform formed by inverting the error voltage FBOUT from the error amplifier 15, that is, the signal from the PWM comparator 16*a* is low level (e.g. time t2 to t3, or t6 to t7), then the high-level pulse signal is outputted to the n-type FET Qn1. Namely, the pulse signal is sent to a terminal DRV2 only in a period in which potential of the triangular wave signal CF is higher than the midpoint potential between the upper limit and the lower limit.

Such a discharge tube lighting apparatus of Embodiment 5 provides an effect similar to that provided by the discharge tube lighting apparatus of Embodiment 1.

In FIG. 13, the SW network is a half-bridge circuit. The discharge tube lighting apparatus may have an SW network of full-bridge circuit and the dead time circuits 21*a* and 21*b* and drivers 18*a* to 18*d* as illustrated in FIG. 7, to provide four outputs.

Embodiment 6

Figure 14:
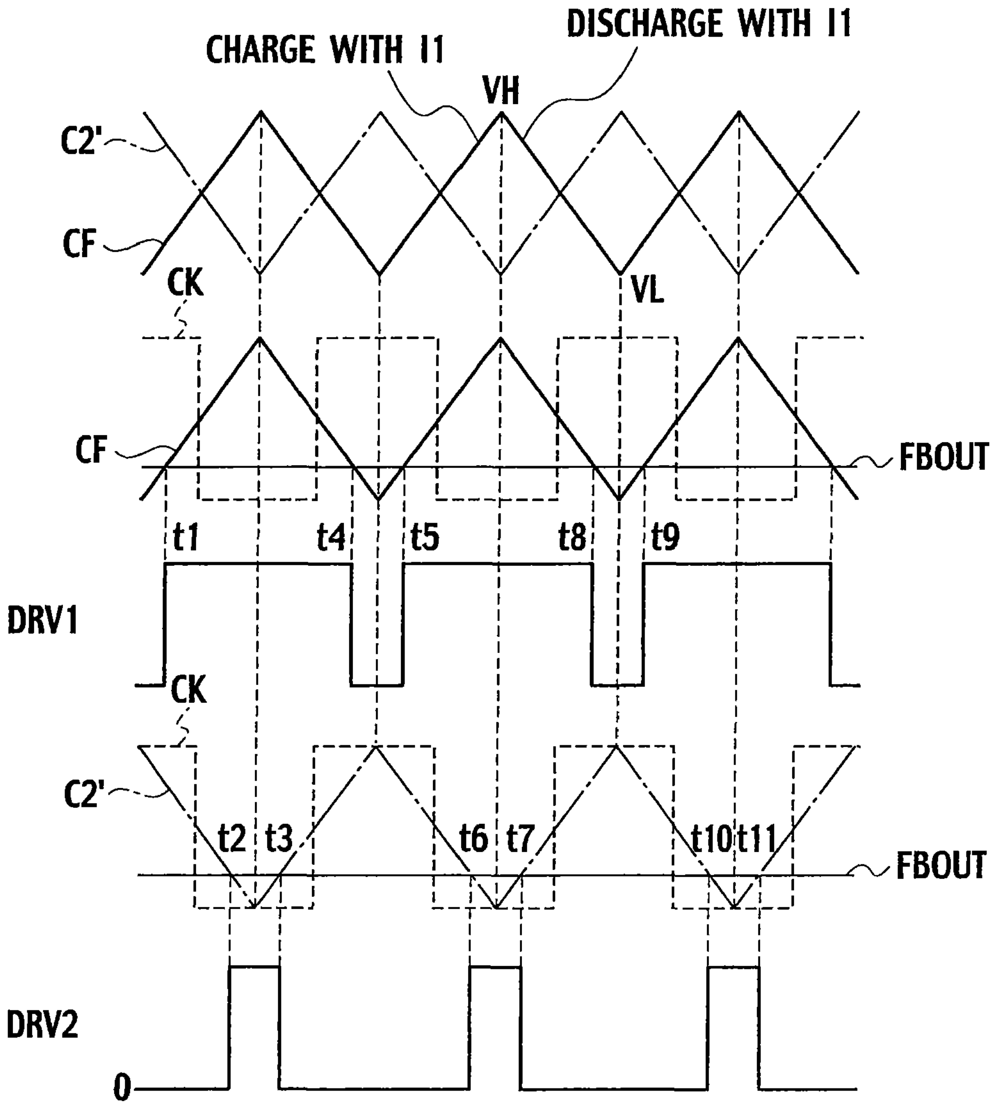
FIG. 14 is a timing chart illustrating signals at various parts of a discharge tube lighting apparatus according to Embodiment 6 of the present invention.

FIG. 14 is a timing chart illustrating signals at various parts of a discharge tube lighting apparatus according to Embodiment 6 of the present invention. A basic circuit configuration thereof is the same as that of the discharge tube lighting apparatus illustrated in FIG. 11 but it differs therefrom in that the timing of a clock CK from an oscillator 12*a* relative to a triangular signal CF differs from that illustrated in FIG. 12.

According to Embodiment 6 illustrated in FIG. 14, the clock CK has a pulse voltage waveform that is synchronized with the triangular wave signal CF and is high level in a period in which potential of the triangular wave signal CF is lower than a midpoint potential between an upper limit VH and a lower limit VL and low level in a period in which the triangular wave signal CF is higher than the midpoint potential.

A NAND gate 17*c* outputs, only when the clock CK from the oscillator 12*a* is high level and a signal from a PWM comparator 16*a* is high level, a low-level pulse signal to a p-type FET Qp1 to turn on the same. Namely, in a period in which potential of the triangular wave signal CF is lower than the midpoint potential between the upper limit and the lower limit, that is, clock CK is high level, and an error voltage FBOUT from an error amplifier 15 is equal to or higher than the triangular wave signal CF, that is, the signal from the PWM comparator 16*a* is high level (e.g. time t4 to t5, or t8 to t9), then the low-level pulse signal is outputted to the p-type FET Qp1. Namely, the pulse signal is sent to a terminal DRV1 only in the period in which potential of the triangular wave signal CF is lower than the midpoint potential between the upper limit and the lower limit.

On the other hand, a subtraction circuit 19*a* provides an inverting terminal (as depicted by "−") of a PWM comparator 16*c* with an inverted waveform C2' formed by inverting the triangular wave signal CF with respect to the midpoint potential between the upper limit and lower limit value thereof. A logic circuit 17*d* outputs, only when an inverted output of the clock CK (low level) from the oscillator 12*a* is high level and the signal from the PWM comparator 16*c* is high level, a high-level pulse signal to an n-type FET Qn1 to turn on the same.

In a period in which potential of the triangular wave signal CF is higher than the midpoint potential between the upper limit and the lower limit, that is, the clock CK is low level, and the signal C2' formed by inverting the triangular wave signal CF around the midpoint potential of the upper and lower limits is equal to or lower than the error voltage FBOUT from the error amplifier 15, that is, the signal from the PWM comparator 16*c* is high level (e.g. time t2 to t3, or t6 to t7), then the high-level pulse signal is outputted to the n-type FET Qn1. Namely, the pulse signal is sent to a terminal DRV2 only in a period in which potential of the triangular wave signal CF is higher than the midpoint potential between the upper limit and the lower limit.

Such a discharge tube lighting apparatus of Embodiment 6 provides an effect similar to that provided by the discharge tube lighting apparatus of Embodiment 1.

In FIG. 14, the SW network is a half-bridge circuit. The discharge tube lighting apparatus may have an SW network of full-bridge circuit and the dead time circuits 21*a* and 21*b* and drivers 18*a* to 18*d* illustrated in FIG. 7, to provide four outputs.

Embodiment 7

Figure 15:
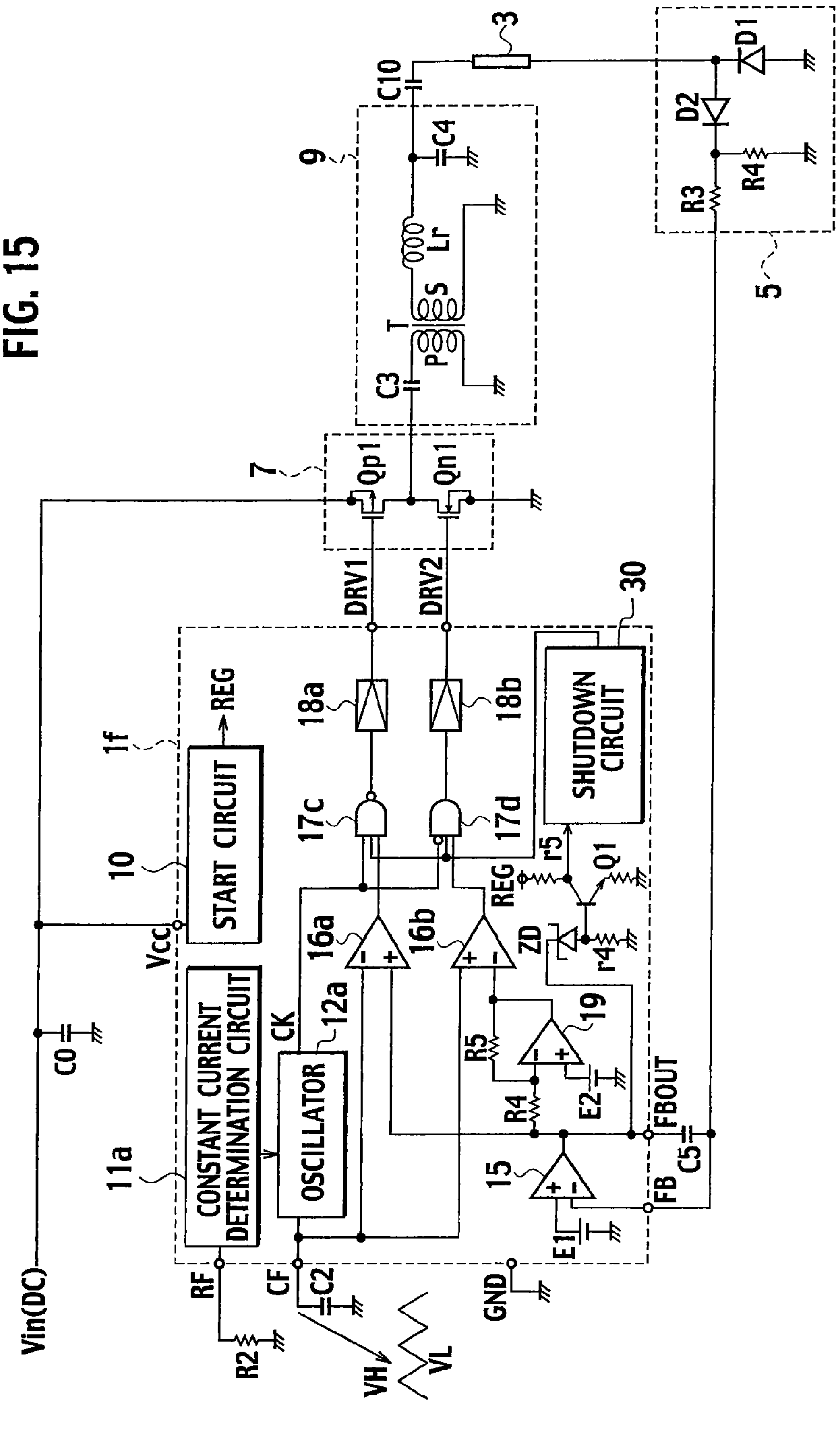
FIG. 15 is a circuit diagram illustrating a configuration of a discharge tube lighting apparatus according to Embodiment 7 of the present invention.

FIG. 15 is a circuit diagram illustrating a configuration of a discharge tube lighting apparatus according to Embodiment 7 of the present invention. The discharge tube lighting apparatus of Embodiment 7 illustrated in FIG. 15 differs from the discharge tube lighting apparatus of Embodiment 1 illustrated in FIG. 3 in that it has a Zener diode ZD, a transistor Q1, and resistors r4 and r5 (corresponding to the duty regulating means of the present invention) that regulates a predetermined maximum ON duty smaller than a duty of 50% for first and second drive signals by limiting an error voltage between a feedback voltage proportional to a current passed through a discharge tube and a reference voltage under a predetermined voltage, as well as a circuit (corresponding to the stopping means of the present invention) that starts an operation of stopping a p-type FET Qp1 and an n-type FET Qn1 when the ON duty of the first and second drive signals reaches the maximum ON duty.

An output of an error amplifier 15 is connected to a cathode of the Zener diode ZD and an anode thereof is connected to an end of the resistor r4 and a base of the transistor Q1. The other end of the resistor r4 and an emitter of the transistor Q1 are grounded. A collector of the transistor Q1 is connected to an end of a resistor R5 and an input side of a shutdown circuit 30. The other end of the resistor R5 is connected to a power source REG. An output side of the shutdown circuit 30 is connected to an input side of a NAND gate 17*c* and an input side of a logic circuit 17*d*.

The remaining parts illustrated in FIG. 15 are the same as those illustrated in FIG. 3, and therefore, the same parts are represented with like reference marks to omit their explanations.

In such a configuration, when an error voltage FBOUT from the error amplifier 15 reaches a total voltage of a breakdown voltage of the Zener diode ZD and a base-emitter voltage of the transistor Q1, the Zener diode ZD breaks down to turn on the transistor Q1. Namely, the error voltage FBOUT never exceeds the total voltage. Accordingly, the value of the total voltage regulates the maximum ON duty of the p-type FET Qp1 and n-type FET Qn1.

When the transistor Q1 turns on, the shutdown circuit 30 receives a low-level input, and therefore, the shutdown circuit 30 outputs a low-level signal to the NAND gate 17*c* and logic circuit 17*d*. As a result, the NAND gate 17*c* provides a high-level output and the logic circuit 17*d* a low-level output, to turn off both the p-type FET Qp1 and n-type FET Qn1.

The shutdown circuit 30 may have a delay timer circuit that delays the shutdown signal by a predetermined time. In the NAND gate 17*c* and logic circuit 17*d*, the delayed signal is timed with signals from PWM comparators 16*a* and 16*b*.

A discharge tube lighting apparatus employing any one of the semiconductor integrated circuits according to Embodiments 1 to 7 can control a current passing through a discharge tube to a predetermined value. A plurality of discharge tube lighting apparatuses according to Embodiments 1 to 7 may be connected as illustrated in FIG. 10, to constitute a synchronous operating system for the discharge tube lighting apparatuses.

Discharge tube lighting apparatuses according to the present invention are not limited to those of the above-mentioned embodiments. According to Embodiments 1 to 7, the second drive signal has an exact phase difference of 180 degrees with respect to the first drive signal. Within a range not to largely deteriorate symmetry of currents passed to the discharge tube 3, the phase difference may deviate from the exact 180 degrees, i.e., it may involve a slight error to make it, for example, 179 degrees, 181 degrees, or the like. The first and second drive signals may be replaced with each other.

Effect of Invention

The present invention employs a triangular wave signal whose inclination for charging an oscillator capacitor and inclination for discharging the same are the same, drives, in a period shorter than a half period of the triangular wave signal, a first group of one or more switching elements with a first drive signal, and drives a second group of one or more switching elements with a second drive signal whose pulse width is substantially the same as that of the first drive signal and which has a phase difference of about 180 degrees with respect to the first drive signal, to pass a current through a discharge tube in a direction opposite to a current passed by the first drive signal. Only by connecting capacitors connected to oscillators of a plurality of discharge tube lighting apparatuses to one another, the present invention can easily and stably operate the plurality of discharge tube lighting apparatuses at the same frequency and same phase.

INDUSTRIAL APPLICABILITY

The discharge tube lighting apparatus according to the present invention is applicable to a large-screen display unit. (United States Designation)

In connection with United States designation, this application claims benefit of priority under 35 USC §119 to Japanese Patent Application No. 2006-274186, filed on Oct. 5, 2006, the entire content of which is incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The invention claimed is:

1. A synchronous operating system for a plurality of DC-AC converters, oscillator capacitors of the plurality of DC-AC converters being commonly connected, AC power from the plurality of DC-AC converters being supplied to a plurality of loads, each of the plurality of DC-AC converters comprising:

a resonant circuit including a capacitor connected to at least one of primary and secondary windings of a transformer, an output thereof being connected to the load;

a plurality of switching elements of network configuration to supply AC power to the load through the resonant circuit;

a first oscillator configured to generate a first triangular wave signal whose inclination for charging the oscillator capacitor and inclination for discharging the oscillator capacitor are the same;

a second oscillator configured to generate a second triangular wave signal that is an inverted signal of the first triangular wave signal;

an error amplifier configured to amplify a voltage related to a current passing through the load with respect to a reference voltage;

a signal generator of an initialize signal configured to alternately allow a first drive signal and a second drive signal during every half period of the first triangular wave signal, wherein the first drive signal is generated for driving at least one of the plurality of the switching elements to supply current to the load, and the second drive signal is generated for driving at least one of the rest of the plurality of the switching elements to supply current to the load in an opposite manner to that of the first drive signal; and wherein:

in a period while the first drive signal is allowed to generate, the first triangular wave signal and an output of the error amplifier are compared to generate the first drive signal with a pulse width related to the current of the load; and in a period while the second drive signal is allowed to generate, the second triangular wave signal and the output of the error amplifier are compared to generate the second drive signal having a pulse width substantially equal to that of the first drive signal and an opposite phase with respect to the first drive signal.

2. A DC-AC converter comprising:

a resonant circuit including a capacitor connected to at least one of primary and secondary windings of a transformer, an output thereof being connected to a load;

a plurality of switching elements of network configuration to supply AC power to the load through the resonant circuit;

an first oscillator configured to generate a first triangular wave signal whose inclinations for charging and that for discharging are the same;

a second oscillator generating a second triangular wave signal that is an inverted signal of the first triangular wave signal;

an error amplifier configured to amplify a voltage related to a current passing through the load with respect to a reference voltage;

a signal generator of an initialize signal configured to alternately allow a first drive signal and a second drive signal during every half period of the first triangular wave signal, wherein the first drive signal is generated for driving at least one of the plurality of the switching elements to supply current to the load, and the second drive signal is generated for driving at least one of the rest of the plurality of the switching elements to supply current to the load in an opposite manner to that of the first drive signal, and wherein in a period while the first drive signal is allowed to generate, the first triangular wave signal and an output of the error amplifier are compared to generate the first drive signal with a pulse width related to the current of the load; and in a period while the second drive signal is allowed to generate, the second triangular wave signal and the output of the error amplifier are compared to generate the second drive signal having a pulse width substantially equal to that of the first drive signal and an opposite phase with respect to the first drive signal.

3. A DC-AC converter according to claim 2, wherein the period while the first drive signal is allowed to generate is one of a rise inclination period and a fall inclination period of the first triangular wave signal and the period while the second drive signal is allowed to generate is another of the rise inclination period and the fall inclination period of the first triangular wave signal.

4. A DC-AC converter according to claim 2, wherein the period while the first drive signal is allowed to generate is one of that while potential of the first triangular wave signal is at or above a midpoint potential between upper and lower limit thereof and that while potential of the first triangular wave signal is at or below the midpoint potential and the period while the second drive signal is allowed to generate is another of that while potential of the first triangular wave signal is at or above the midpoint potential between upper and lower limit thereof and that while potential of the first triangular wave signal is at or below the midpoint potential.

5. An integration circuit for controlling a plurality of switching elements of network configuration to supply power to a load, comprising:

a first oscillator configured to generate a first triangular wave signal whose inclinations for charging and that for discharging are the same;

a second oscillator configured to generate a second triangular wave signal that is an inverted signal of the first triangular wave signal;

an error amplifier configured to amplify a voltage related to a current passing through the load with respect to a reference voltage;

a signal generator of an initialize signal configured to alternately allow a first drive signal and a second drive signal during every half period of the first triangular wave signal, the first drive signal being generated for driving at least one of the plurality of the switching elements to supply current to the load, and the second drive signal being generated for driving the rest of the plurality of the switching elements to supply current to the load in an inverted manner, wherein in a period while the first drive signal is allowed to generate, the first triangular wave signal and an output of the error amplifier are compared to generate the first drive signal having a pulse width related with the current of the load; and in a period while the second drive signal is allowed to generate, the second triangular wave signal and the output of the error amplifier are compared to generate the second drive signal having a pulse width substantially equal to that of the first drive signal and an opposite phase with respect to the first drive signal.

6. An integration circuit according to claim 5, wherein the period while the first drive signal is allowed to generate is one of a rise inclination period and a fall inclination period of the first triangular wave signal and the period while the second drive signal is allowed to generate is another of the rise inclination period and the fall inclination period of the first triangular wave signal.

7. An integration circuit according to claim 5, wherein the period while the first drive signal is allowed to generate is one of that where potential of the first triangular wave signal is at or above a midpoint potential between upper and lower limit thereof and that while potential of the first triangular wave signal is at or below the midpoint potential and the period while the second drive signal is allowed to generate is another of that where potential of the first triangular wave signal is at or above the midpoint potential between upper and lower limit thereof and that while potential of the first triangular wave signal is at or below the midpoint potential.

8. An integration circuit according to claim 5, wherein the first and second drive signals each has a predetermined maximum ON duty being smaller than a duty of 50%.

9. An integration circuit according to claim 5, wherein an operation of stopping each switching element starts when an ON duty of the first and second drive signals reaches a predetermined maximum ON duty being smaller than a duty of 50%.

* * * * *